(12) United States Patent
Brown et al.

(10) Patent No.: US 8,871,295 B2
(45) Date of Patent: *Oct. 28, 2014

(54) METHOD FOR SEPARATING HIGH ASPECT RATIO MOLECULAR STRUCTURES

(75) Inventors: David P. Brown, Espoo (FI); Albert G. Nasibulin, Espoo (FI); Esko I. Kauppinen, Helsinki (FI); David Gonzalez, Helsinki (FI)

(73) Assignee: Canatu Oy, Espoo (FI)

( * ) Notice: Subject to any disclaimer, the term of this patent is extended or adjusted under 35 U.S.C. 154(b) by 818 days.

This patent is subject to a terminal disclaimer.

(21) Appl. No.: 12/281,868

(22) PCT Filed: Mar. 7, 2007

(86) PCT No.: PCT/FI2007/000060
§ 371 (c)(1),
(2), (4) Date: Mar. 9, 2009

(87) PCT Pub. No.: WO2007/101907
PCT Pub. Date: Sep. 13, 2007

(65) Prior Publication Data
US 2009/0280238 A1     Nov. 12, 2009

(30) Foreign Application Priority Data
Mar. 8, 2006    (FI) .................... 20060227

(51) Int. Cl.
*B82Y 10/00* (2011.01)
*B82Y 30/00* (2011.01)
*B82Y 40/00* (2011.01)
*B82B 3/00* (2006.01)
*C01B 31/02* (2006.01)

(52) U.S. Cl.
CPC ............ *C01B 31/0206* (2013.01); *B82Y 40/00* (2013.01); *B82Y 30/00* (2013.01); *B82B 3/00* (2013.01); *Y10S 977/742* (2013.01); *Y10S 977/84* (2013.01); *Y10S 977/842* (2013.01); *Y10S 977/845* (2013.01)
USPC ............ 427/122; 427/58; 427/180; 427/202; 427/206; 427/256; 427/258; 427/259; 427/261; 427/282; 204/164; 977/742; 977/840; 977/842; 977/845

(58) Field of Classification Search
USPC .......................................................... 427/196
See application file for complete search history.

(56) References Cited

U.S. PATENT DOCUMENTS

| 7,884,300 B2 | 2/2011 | Akasaka et al. |
| 2003/0090190 A1 | 5/2003 | Takai et al. |

(Continued)

FOREIGN PATENT DOCUMENTS

| JP | 2005104750 A | 4/2005 |
| WO | 03084869 A2 | 10/2003 |

(Continued)

OTHER PUBLICATIONS

Vaezi-Nejad, Selected Topics in Advanced Solid State and Fibre Optic Sensors, The Institution of Engineering and Technology, (Oct. 10, 2000), pp. 166-167.*

(Continued)

*Primary Examiner* — Michael Cleveland
*Assistant Examiner* — Lisha Jiang
(74) *Attorney, Agent, or Firm* — Studebaker & Brackett PC

(57) ABSTRACT

A method for moving high aspect ratio molecular structures (HARMS), which method comprises applying a force upon a dispersion comprising one or more bundled and individual HARM-structures, wherein the force moves the bundled and/or the individual HARM-structure based on one or more physical features and/or properties for substantially separating the bundled and individual HARM-structures from each other.

9 Claims, 12 Drawing Sheets

(56) References Cited

U.S. PATENT DOCUMENTS

| | | |
|---|---|---|
| 2003/0102222 A1 | 6/2003 | Zhou et al. |
| 2003/0178307 A1* | 9/2003 | Sarkar .................... 204/483 |
| 2004/0038251 A1* | 2/2004 | Smalley et al. ............ 435/6 |
| 2004/0040834 A1* | 3/2004 | Smalley et al. ........... 204/164 |
| 2005/0164583 A1 | 7/2005 | Geohegan et al. |
| 2006/0131172 A1 | 6/2006 | Kim et al. |
| 2007/0045119 A1* | 3/2007 | Sandhu .................... 205/89 |
| 2007/0046164 A1 | 3/2007 | Subramanian |
| 2008/0308772 A1 | 12/2008 | Akasaka et al. |
| 2009/0304945 A1* | 12/2009 | Brown et al. ............. 427/462 |

FOREIGN PATENT DOCUMENTS

| | | |
|---|---|---|
| WO | 2004015786 A2 | 2/2004 |
| WO | 2005007565 A2 | 1/2005 |
| WO | 2005041227 A2 | 5/2005 |
| WO | 2005061382 A1 | 7/2005 |
| WO | 2005085130 A2 | 9/2005 |
| WO | 2005085131 A2 | 9/2005 |
| WO | 2006013788 A1 | 2/2006 |
| WO | 2006138263 A2 | 12/2006 |

OTHER PUBLICATIONS

Li, Encyclopedia of Microfluidics and Nanofluidics, Springer, (2008), pp. 2.*

Finnish Search Report for Application No. 20060227, dated Jan. 19, 2007.

Finnish Search Report for Application No. 20060227, dated Oct. 4, 2007.

Finnish Search Report for Application No. 20060227, dated May 22, 2008.

Finnish Official Action for Application No. 20060227, dated May 22, 2008 w/English Translation.

International Search Report for Application No. PCT/FI2007/000060, dated Jun. 25, 2007.

Dong, Lifeng et al., "Floating-Potential Dielectrophoresis-Controlled Fabrication of Single-Carbon-Nanotube Transistors and Their Electrical Properties", J. Phys. Chem. B 2005, 109, pp. 13148-13153.

Kim, S.H. et al., "In-flight size classification of carbon nanotubes by gas phase eletrophoresis", Institute of Physics Publishing, Nanotechnology 16 (2005) pp. 2149-2152.

* cited by examiner

METHOD FOR SEPARATING HIGH ASPECT RATIO MOLECULAR STRUCTURES

The invention relates to a method for moving High Aspect Ratio Molecular Structures (HARMS) and to the use of the method.

PRIOR ART

High aspect ratio molecular structures (HARMS) are promising building blocks for devices from the nanoscale upwards due to their small size and their unique, nearly one-dimensional morphology. Examples of HARM-structures include nanotubes (NTs) for example carbon nanotubes (CNTs), fullerene functionalized carbon nanotubes (FFCNTs), boron-nitride NTs (BNNTs), nanorods including carbon, phosphorous, boron, nitrogen and silicon containing nanorods, filaments and other tubular, rod, or ribbon or otherwise high aspect ratio molecular structures.

HARMS-based architectures such as field-effect transistors, field emission displays, memory devices, quantum wires and logic gate circuits have already been demonstrated. For further progress and wider application, however, the development of methods for the controllable and economical synthesis, separation, collection, deposition, patterning and incorporation into devices of HARM-structures are extremely desirable. In particular, many applications of HARM-structures require largely individual (i.e. unbundled) HARM-structures to be in gaseous, liquid or solid dispersions or as a deposit on a surface in the form a layer, film, patterned deposit or three dimensional structure.

However, a problem is that, due to strong intermolecular forces (such as van der Waals and Coulomb), many types of HARM-structures spontaneously form bundles during their synthesis, transport and/or storage. For example, production of CNTs by carbon-arc discharge, laser ablation and/or high pressure CO processes is associated with a high degree of tube bundling.

Methods to selectively produce isolated HARM-structures in dispersions, layers, films, or structures are known in the art.

However, a problem with prior art methods is that separation of isolated HARM-structures typically requires separate synthesis, purification, functionalization and/or deposition steps necessitating the utilization of surfactants, polymers, peptides or other compounds to exfoliate the bundles and extract individuals. Such processes may significantly alter the original properties of the HARM-structures and are expensive, time consuming and inefficient.

Methods such as supported chemical vapor deposition (CVD) have been used for the direct synthesis of isolated HARM-structures on surfaces. However, the requirement of using high growth temperatures and/or specific surface reactivity inevitably limits the use of temperature sensitive or reactive substrate materials (e.g. polymers) and inhibits the simple integration of the HARM-structures into, for example, nanoscale electronic devices, conductive films or structural composites.

The objective of the present invention is to eliminate the drawbacks referred to above.

An object of the present invention is to provide a new method for separating HARM-structures. An object of the present invention is to improve the efficiency of use of synthesis materials and product yield, reduce or eliminate the degradation of HARM-structures during processing, permit the separation of bundled and individual HARM-structures and allow low temperature homogeneous or patterned deposition on a wide variety of substrates that would be highly beneficial to industry and commerce.

SUMMARY OF THE INVENTION

The method and its use are characterised by what has been presented in the claims.

The invention is based on research work carried out in which it was surprisingly found that HARM-structures have particular useful properties.

The term HARM-structure (high aspect ratio molecular structure) is meant to include, but not be limited to, a nanotube, a carbon nanotube, a fullerene functionalized carbon nanotube, a boron-nitride nanotube, a nanorod including carbon, phosphorous, boron, nitrogen and/or silicon containing nanorod, a filament and/or any other tube, tubular, rod and/or ribbon and/or any other high aspect ratio molecular structure in, for example, individual or bundled form. In other words, by one or more HARM-structures can be meant one or more different and/or similar HARM-structures. By one or more HARM-structures can be meant one or more similar HARM-structures, for example carbon nanotubes, for example, in bundled and/or individual form.

One particular property of HARM-structures is the spontaneous charging of bundles of HARM-structures and the electrical neutrality of the individual HARM-structures. During the synthesis process, and in the absence of any additional charging, for example, bundled CNTs largely carry a net electric charge while individual CNTs are largely uncharged. Similar behavior occurs in all HARM-structures since they are substantially one-dimensional structures and have a high fraction of surface atoms available for direct contact with neighboring HARM-structures, which gives rise to the charging. This charging phenomenon can be used in one embodiment of the present invention to move (for example accelerate), separate and/or deposit one or more HARM-structures, for example individual and/or bundled HARM-structures. Also different other properties of the HARM-structures can be used to, for example, separate bundled and individual HARM-structures from each other. For example, the increased mass of bundled HARM-structures relative to individuals can be used to separate them via their differing ratio of inertial to drag forces. This ratio is determined by the Stokes number (St) defined as $St=(\rho\, d\, U)/(18\, \mu L)$, where $\rho$ is the effective density of the individual or bundled HARM-structure, d is the effective diameter of the bundled or individual HARM-structure, U is the carrier fluid speed, $\mu$ is the carrier fluid viscosity, and L is the characteristic dimension of the channel or jet. Bundled HARM-structures exhibit higher stokes numbers than individual.

In the method of the present invention high aspect ratio molecular structures (HARMS) are moved by applying a force upon one or more HARM-structures, which force moves one or more HARM-structures based on one or more physical features and/or properties towards one or more predetermined locations. In other words, the force moves said one or more HARM-structures in one or more predetermined directions. The force can, for example, move bundled structures but not the individual ones. Also, the force can selectively move specific previously charged structures.

The present invention relates to a method for moving high aspect ratio molecular structures (HARMS), in which method a force is applied upon a dispersion, for example a mixture, which comprises one or more bundled and individual HARM-structures, wherein the force moves the bundled and/or the individual HARM-structure based on one or more physical features and/or properties for substantially separating the bundled and individual HARM-structures from each other. Preferably the force moves substantially either the bundled or the individual HARM-structure.

The physical feature and/or property can be, for example, the charge and/or mass of the HARM-structure and/or any other feature, for example property, based on which a specific HARM-structure is acted upon and thereby moved by the force. By a physical feature and/or property is meant for example any naturally occurring feature and/or property of the HARM-structure and/or any feature, for example property, that has been given the HARM-structure. For example, the HARM-structure can be charged by any suitable means before and/or during the performing of the method according to the present invention. For example, in addition and/or alternatively to the natural charge of the bundled and to the natural neutral charge of individual structures, one or more desired specific HARM-structures can be charged using any suitable manner before performing the method. In this way, for example, individual naturally uncharged HARM-structures can also be charged, for example to enable their deposition. Also both bundled and individual HARM-structures can be charged in order to provide them the desired physical feature so that both react to the force applied. Preferably such a physical feature and/or property based on which the force moves one or more HARM-structures is a charge, either a naturally occurring charge or a provided charge.

In one embodiment of the present invention the method is performed as a step after the synthesis and/or production of HARM-structures. In other words the HARM-structures can be produced before performing the method according to the invention and/or can be produced as a continuous process with the method according to the present invention. The method according to the present invention can also be performed in the production step of HARM-structures.

In one embodiment of the invention said dispersion, for example mixture, can be suspended in a gas phase as an aerosol, suspended in a liquid as an aquasol, suspended in a granular and/or powder media, a glass and/or a solid and/or exist in a vacuum. The HARM-structures can be formulated as a dispersion in a gas, a dispersion in a liquid and/or a dispersion in a solid.

The dispersion can, for example, be introduced into an electrical force field, wherein the naturally charged bundled HARM-structures move or accelerate in the electric field while individual HARM-structures are substantially unaffected. In other words, said force moves, for example selectively, the bundled and/or individual HARM-structures relative to one another so that in this way the bundled and individual HARM-structures are separated and/or isolated.

In one embodiment of the present invention the method further comprises depositing one or more HARM-structures in a gaseous, liquid, and/or solid dispersion and/or matrix and/or on a surface as a layer, pattern and/or structure. For example bundled or individual HARM-structure can be deposited. For example separated bundled and/or individual HARM-structure can be deposited. For example bundled and individual HARM-structures can be deposited. For example, a dispersion of bundled and individual HARM-structures can be deposited.

For example, previously moved by the method according to the present invention and thereby separated, bundled HARM-structures can be deposited on a surface, if desired. For example, in this way it is possible to remove said HARM-structures from the dispersion and to collect them for further use. Said HARM-structures can also, if desired, be made to remain as a dispersion and in that way generate two dispersions comprising bundled and individual HARM-structures, respectively.

Different types of forces can be used in the method according to the present invention. The force moving and separating and, for example, further depositing the one or more HARM-structures, can be an electrical, an electrostatic, a magnetic, an inertial, an acoustic, a viscous, a photophoretic, a thermophoretic, and/or gravitational force. Different kinds of forces can be combined. Forces can be combined to include, for example, inertial impaction, gravitational settling and acoustic focusing.

In one embodiment of the present invention the HARM-structure is a naturally charged or uncharged structure. In one embodiment of the present invention the HARM-structure is positively, negatively or neutrally-charged (zero-charged). In one embodiment of the present invention the HARM-structure is provided a charge using any suitable process.

In one embodiment of the present invention the force moving the one or more HARM-structures comprises an electrical force moving the naturally charged bundled HARM-structure. In one embodiment of the present invention the force comprises an inertial force, which acts upon and thereby preferably moves the bundled HARM-structure.

In one embodiment of the present invention the electrical force moving the one or more HARM-structures is provided by means of an electrostatic force, i.e. an electrical field. The electrostatic force can be provided, for example, by means of contacting a conductive material to a non- or semiconducting substrate so as to charge the surface of the substrate, whereby one or more similar and/or different HARM-structures having a given electrical charge move towards the region of the surface having the opposite charge. The conducting material can have a form of a patterned stamp or mask. This patterned stamp or mask can be transferred to the non- or semiconducting material surface by contact charging. The desired HARM-structure only move towards the charged pattern, where it is deposited thereby forming a patterned deposition of HARM-structures.

Further, the force for moving, for example accelerating, and/or further depositing can be a thermophoretic force. A thermophoretic force can be provided, for example, by means of a heated plate or surface in proximity to a parallel cooled plate or surface so as to cause the desired one or more HARM-structures to move in the direction of the cooled plate or surface. Furthermore, the cooled plate can be heated in predetermined regions so as to form a pattern of alternatively hot and cold regions and thus cause the desired one or more HARM-structures to move to the cold regions thereby forming a patterned deposition of HARM-structures. It is also possible to place a substrate between said cooled plate or surface and dispersion/mixture of HARM-structures so as to cause the desired one or more HARM-structures to move to the cold regions thus forming patterned deposition on the substrate.

In one embodiment of the present invention one or more reactants, agents, coating materials, functionalizing materials, surfactants and/or dopants can be added to the one or more HARM-structures, for example, to a dispersion of bundled and individual HARM-structures, to bundled HARM-structures or to individual HARM-structures. In this way it is possible to, for example, modify the HARM-structure prior to deposition and/or, for example, form a composite or functionalized material or otherwise modify the one or more HARM-structures prior to deposition.

Separated dispersed individual and/or bundled HARM-structures can be deposited by the method according to the present invention on and/or in a surface, film and/or solid, liquid and/or gaseous dispersion and/or matrix material. HARM-structures can also be oriented, coated, functionalized and/or otherwise modified before and/or after they are for example deposited and/or collected. The bundled and/or individual HARM-structures can be deposited in a pattern and/or structures in defined locations.

Further, various means can be used to increase the efficiency of deposition of the HARM-structures including, but not limited to, electrophoresis, magnetophoresis, thermophoresis, inertial impaction, gravitational settling, photophoresis, acoustic focusing and/or some other similar means.

HARM-structures, for example HARM-structure composites, can be formulated as a dispersion in a gas, liquid, solid, powder, paste and/or colloidal suspension and/or they can be deposited on a surface.

The present invention further relates to the use of the method in a continuous or batch process for the production, separation, modification, deposition and/or further processing of one or more HARM-structures.

The present invention further relates to the use of the method according to the present invention in the preparation of a functional material.

The present invention further relates to the use of the method according to the present invention in the preparation of a thick or thin film, a line, a wire, a pattern, a layered and/or three dimensional structure.

The present invention further relates to the use of the method according to the present invention in the preparation of a device. The device can, for example, be an electrode of a capacitor, a fuel cell or battery, a logical gate, an electromechanical actuator, an inverter, a probe or sensor, a light source or diode, a thermionic power supply, a field effects transistor, a heat sink or heat spreader, a metal-matrix composite or polymer-matrix composite in a printed circuit, a transistor, a carrier for drug molecules or electron emitter in a field emission display. The device can further be any other device in which preparation the method according to the present invention can be used.

An advantage of the method according to the present invention is that it can be performed as a continuous and/or batch process. Further, the method allows in situ separation of individual HARM-structures and bundles of HARM-structures in the presence or absence of a supporting media.

An advantage of the method according to the present invention is that it does not require the use of high substrate temperatures or surface reactivity and does not require that the HARM-structures to be synthesized in the same position where they are deposited. In this way the method allows a wide range of previously unavailable substrates and/or synthesis methods to be used for material, component or device manufacture. The advantage is that the separation can be followed by the dispersion, homogenous and/or patterned deposition of said HARM-structures on a wide variety of substrates without any temperature and/or reactivity limitation. For example, since collection can be carried out at ambient temperature, this enables the deposition of individual or bundled CNTs, for example, on a wide variety of substrates, including those substrates which cannot withstand elevated processing temperatures. The method further allows the HARM-structures to be synthesized in a location different from where they are separated, deposited, collected and/or patterned thus allowing the use of a wide range of substrates, patterning and/or synthesis methods.

A further advantage is that the HARM-structures can be directly deposited on a surface as a film or layer or in a three dimensional structure or in a gaseous, liquid or solid dispersion. The HARM-structures can also be directly deposited in a patterned and/or layered deposition on a surface or in a three dimensional patterned multi-layer structure which can be incorporated into HARM based devices.

Further, the separation and/or deposition processes can be directly combined with, for example, HARM-structure synthesis processes. Hereby, the method according to the present invention can be combined into a continuous process for the production of HARM-structure based dispersions, films, patterns and layered structures. In other words, the method according to the present invention can be part of a comprehensive process, which can comprise several different steps including, but not limited to, the synthesis of HARM-structures, the separation of different kinds of HARM-structures, their deposition and reuse of unused reagents, for example, in the synthesis of HARM-structures.

LIST OF FIGURES

In the following section, the invention will be described in detail by means of embodiment examples with reference to accompanying drawings, in which FIG. 1 illustrates one embodiment of the present method for moving HARM-structures and thereby separating bundled from individual HARM-structures.

DETAILED DESCRIPTION OF THE INVENTION

Figure 1:
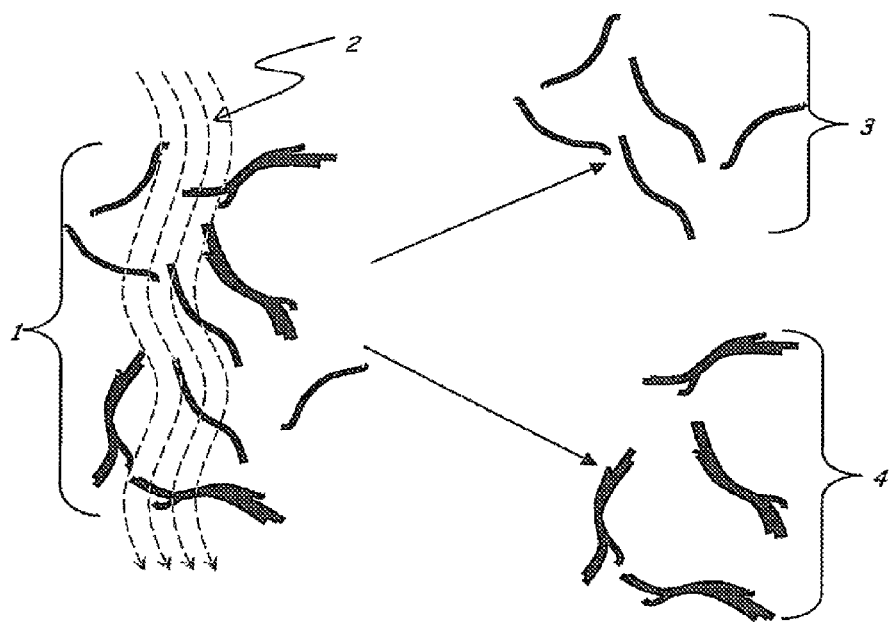

FIG. 1 illustrates one embodiment of the present method for moving and thereby separating bundled from individual HARM-structures. A mixture of bundled and individual HARM-structures (1) is collectively subjected to a force (2) which selectively acts on either the bundled or individual HARM-structures, based on at least one of their physical features, for example properties, distinguishing them, such that they are moved, for example accelerated, relative to one another so as to become separated in space into a plurality of individual (3) and bundled (4) HARM-structures.

Figure 2A:
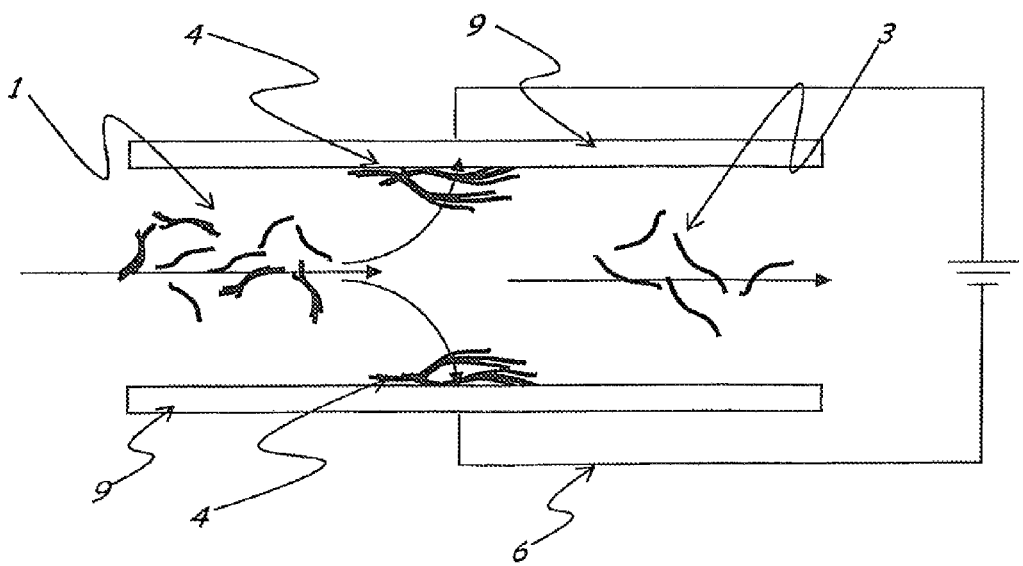
FIG. 2a illustrates one embodiment of the present method for continuously separating and selectively depositing bundled HARM-structures.

FIG. 2a illustrates one embodiment of the present invention, wherein a mixture of bundled and individual HARM-structures (1) is suspended in, for example, a carrier gas, a liquid or is suspended in a vacuum. Said dispersion is caused to pass through an electric field due to a voltage differential (6). Since bundled HARM-structures are naturally substantially charged and the individual HARM-structures are substantially uncharged, the electric field causes the bundled HARM-structures (4) to migrate in the electric field (the direction dependant upon the sign of their net charge) and be separated from the individual HARM-structures (3), which pass through the electric field largely unaffected. In other words, the naturally charged HARM-structures are accelerated toward the channel walls (9) while the individual HARM-structures exit the channel.

Figure 2B:
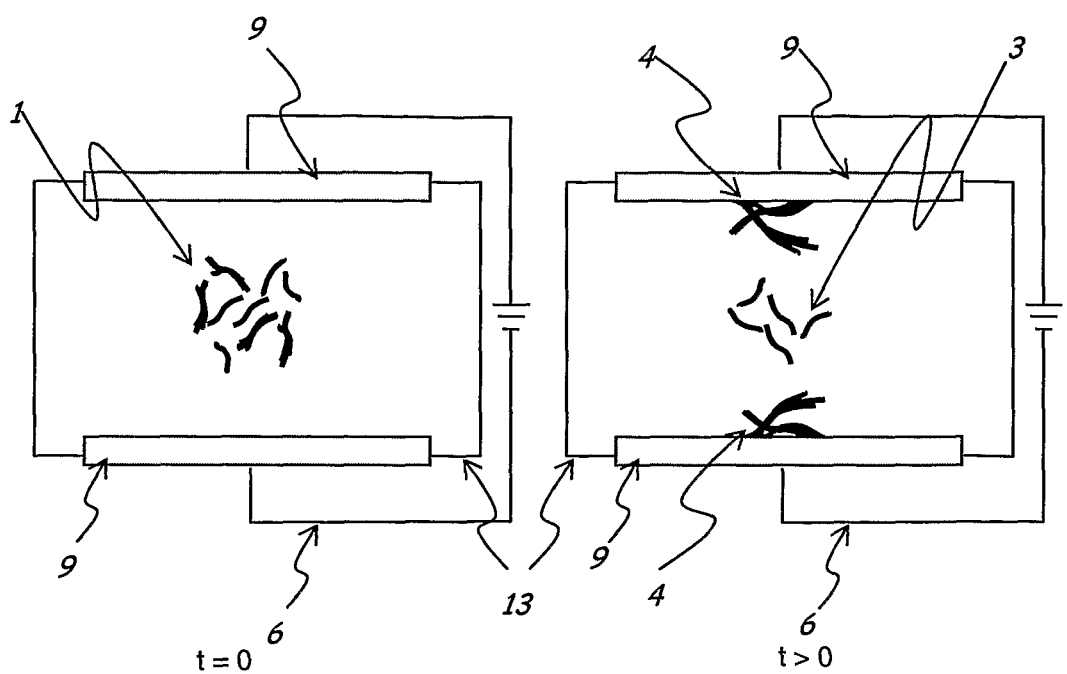
FIG. 2b illustrates one embodiment of the present method for batch separation and selective deposition of bundled HARM-structures.

Similarly, FIG. 2b illustrates the method performed in batch mode, wherein the dispersion of bundled and individual HARM-structures (1) is put in a chamber (13), wherein an electrical potential or a voltage (6) is applied to cause the separation and deposition of bundled (4) and individual (3) HARM-structures. Naturally charged bundled HARM-structures are accelerated toward the walls (9) while the individual HARM-structures remain suspended.

Figure 3A:
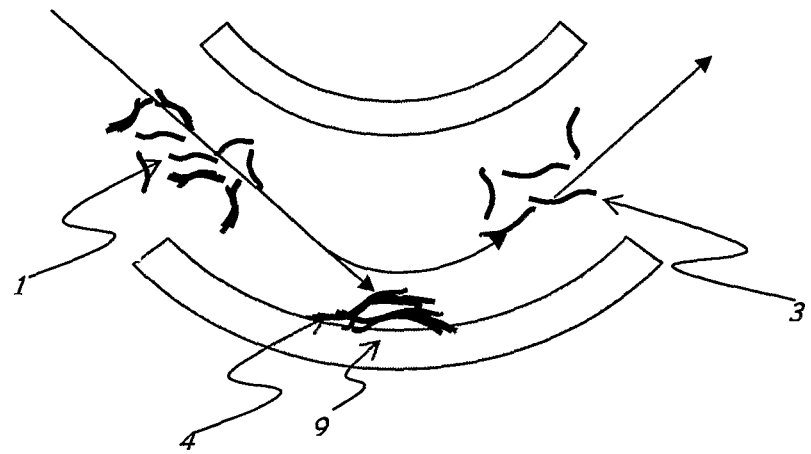
FIGS. 3a, 3b and 3c illustrate other embodiments of the present method for separating and selectively depositing bundled from individual HARM-structures.
Figure 3B:
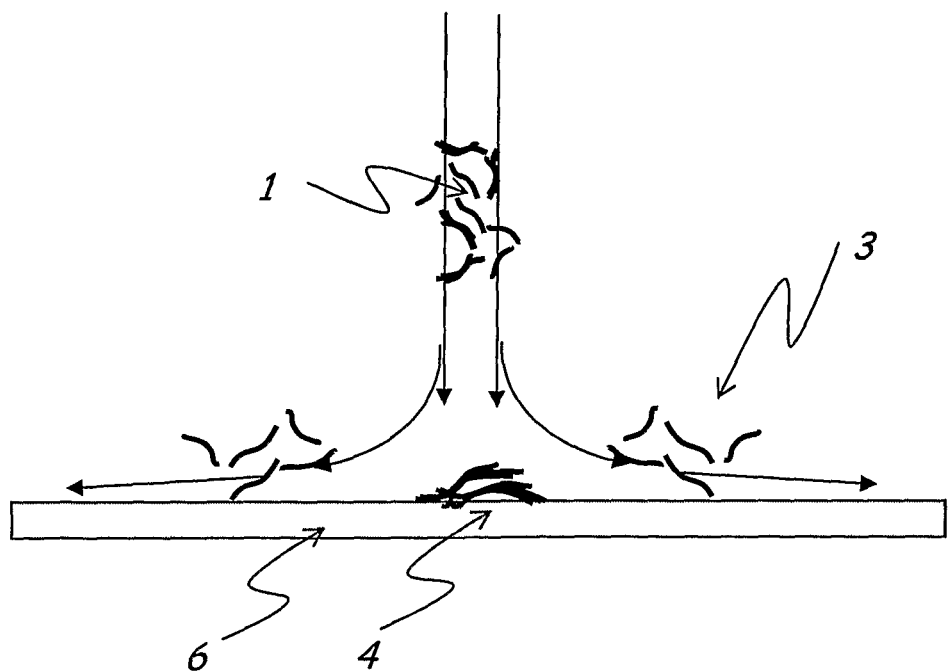
Figure 3C:
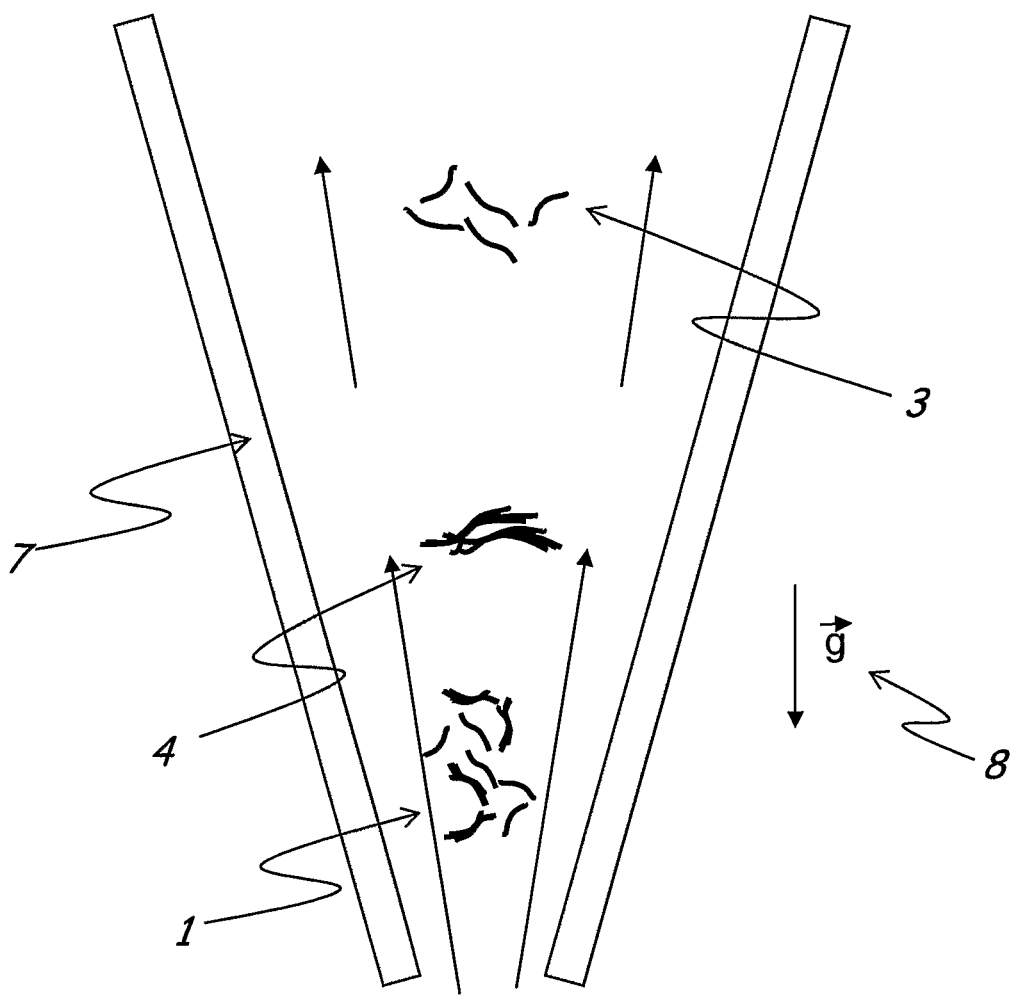

FIG. 3 illustrates another embodiment of the present method, wherein the mixture of bundled and unbundled HARM-structures (1) are suspended in a liquid or gas and subjected to a force, in this case an inertial or gravitational acceleration, thus causing the bundled (4) and individual (3) HARM-structures to separate. Here, bundled HARM-structures are selectively deposited from individual HARM-structures and a suspension of individual HARM-structures is generated via balancing inertia and drag. The dispersion is, in this embodiment, introduced into a curved channel (9) a) or directed towards a surface (4) b) and the bundled HARM-structures having a higher effective Stokes number are accelerated toward the surface while the individual HARM-structures remain suspended. Furthermore, the bundled HARM-structures can be made to deposit on a substrate. Alternatively c), the dispersion of individual and bundled HARM-structures (1) is fed into an expanding channel (7) in the opposite direction to the acceleration of gravity (8). The velocity of the suspending liquid or gas is decreased in the expanding volume. Thereby, the individual HARM-structures (3) having a lower Stokes number than the bundled HARM-structures (4) are carried further up the channel than the bundled HARM-structures, thereby causing them to separate.

Figure 4:
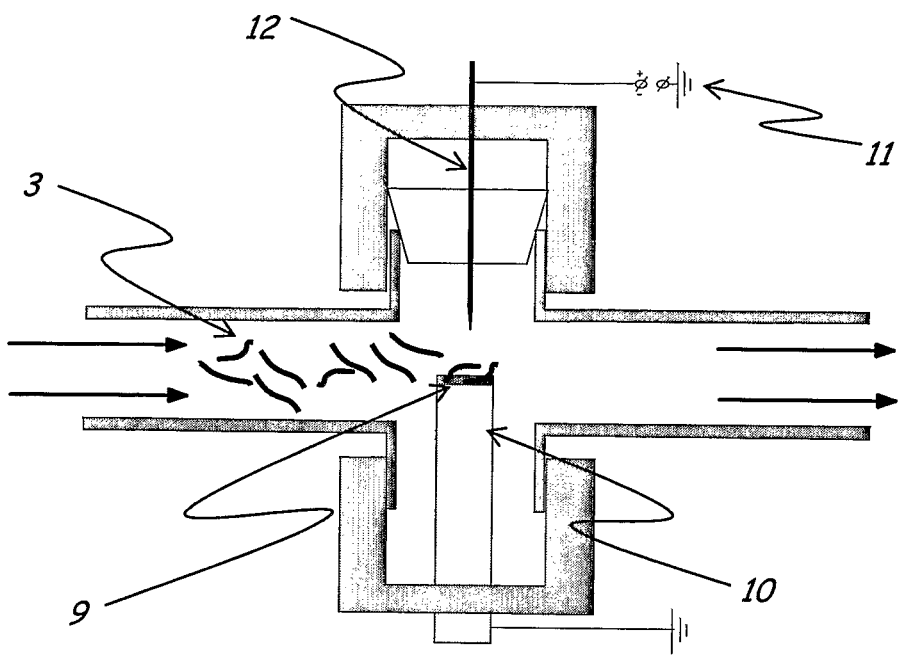
FIG. 4 illustrates one embodiment of the present method for depositing individual HARM-structures.

FIG. 4 illustrates that for example separated individual HARM-structures (3) can be deposited on a separate substrate (9) by electrostatic precipitation. Herein a voltage (11) is applied to a needle (12) to create an electron cloud, which charges the previously uncharged individual HARM-structures. In this device, HARM-structures are charged by field charging using a corona discharge that ionizes the gas and creates a small current between two plates. Thereafter, the use of a force, in this case an electrostatic migration velocity, will make them to deposit on the grounded collection plate (10) where the substrate (9) is located. Moreover, the deposition location can be determined by local variation of the electric field, thus allowing patterned deposition. Various means are available for the localization of the electric field.

Figure 5:
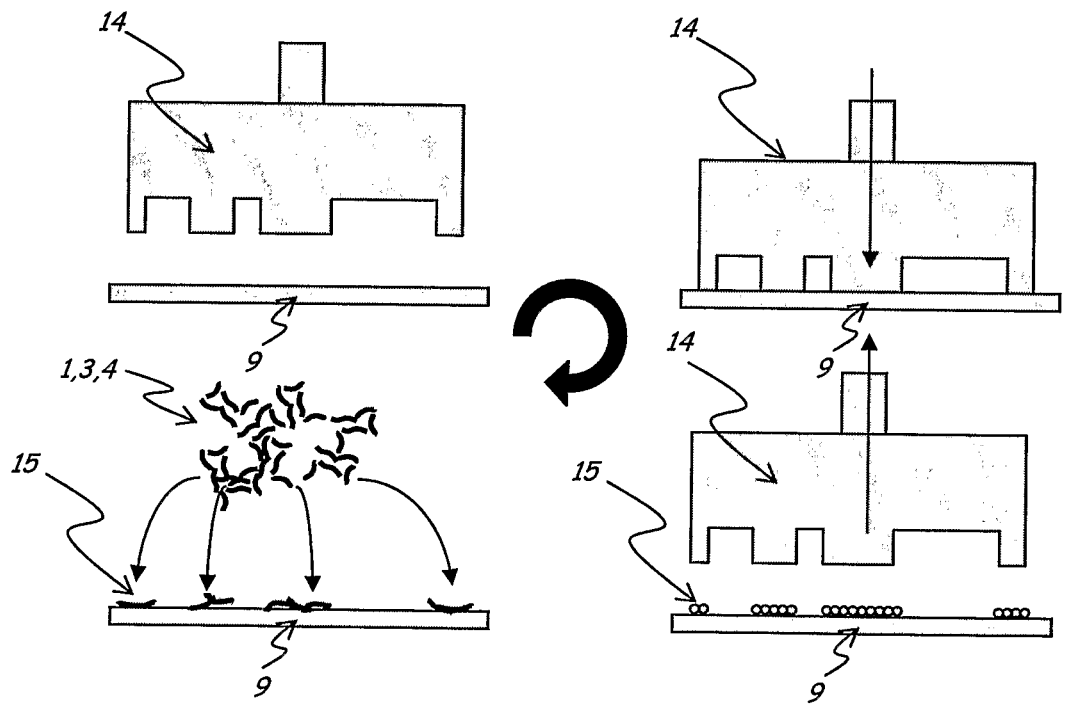
FIG. 5 illustrates one embodiment of the present invention for patterned deposition of mixed bundled and individual, only bundled and/or only individual HARM-structures.

FIG. 5 illustrates one way of allowing patterned deposition by use of an electrostatic force. A pattern of charge can be localized on a semi or nonconductive substrate (9) by, for example, making a stamp or mask of conductive material (14) and applying the mask to the substrate so as to contact charge those areas of the substrate in contact with the stamp or mask (15). After the stamp or mask is removed, the contacted areas remain charged and a dispersion of a mixture of bundled and individual (1), bundled (4) or individual (3) HARM-structures are then brought into the vicinity of the charged substrate whereupon the local electric field causes those with an opposite charge to accelerate toward the predetermined pattern and to deposit according to the pattern of the stamp or mask. The resolution of the deposition pattern is thus approximately equal to that of the stamp or mask.

Figure 6:
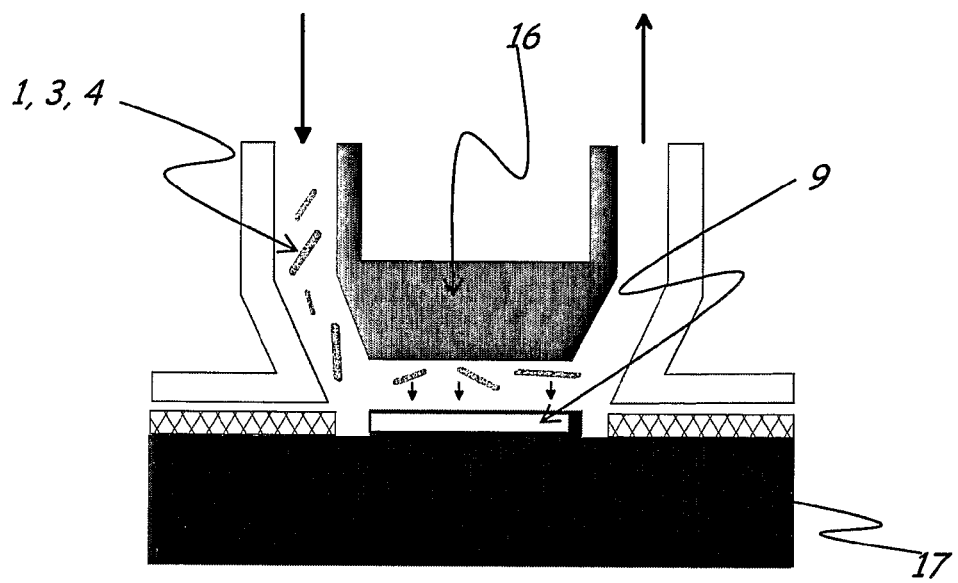
FIG. 6 illustrates one embodiment of the present method for deposition of mixed bundled and individual, only bundled and/or only individual HARM-structures by thermophoresis.

FIG. 6 illustrates one embodiment of the present invention, wherein a thermoforetic force is used to deposit HARM-structures (1,3,4) on a substrate. A notable advantage of depositing particles using the thermophoretic precipitator is the possibility of employing any type of substrates. Here, an aerosol of carrier gas and HARM-structures is made to pass between a gap between a heated plate (16) and a cooled plate (17). Various means known in the art can be used to heat and cool the plates, but in the preferred embodiment, the hot plate is heated via an electric current and the cold plate is cooled conductively via a flow of cold water. The HARM-structures then migrate from the hot plate to the cold and are deposited on the attached substrate (9).

Figure 7A:
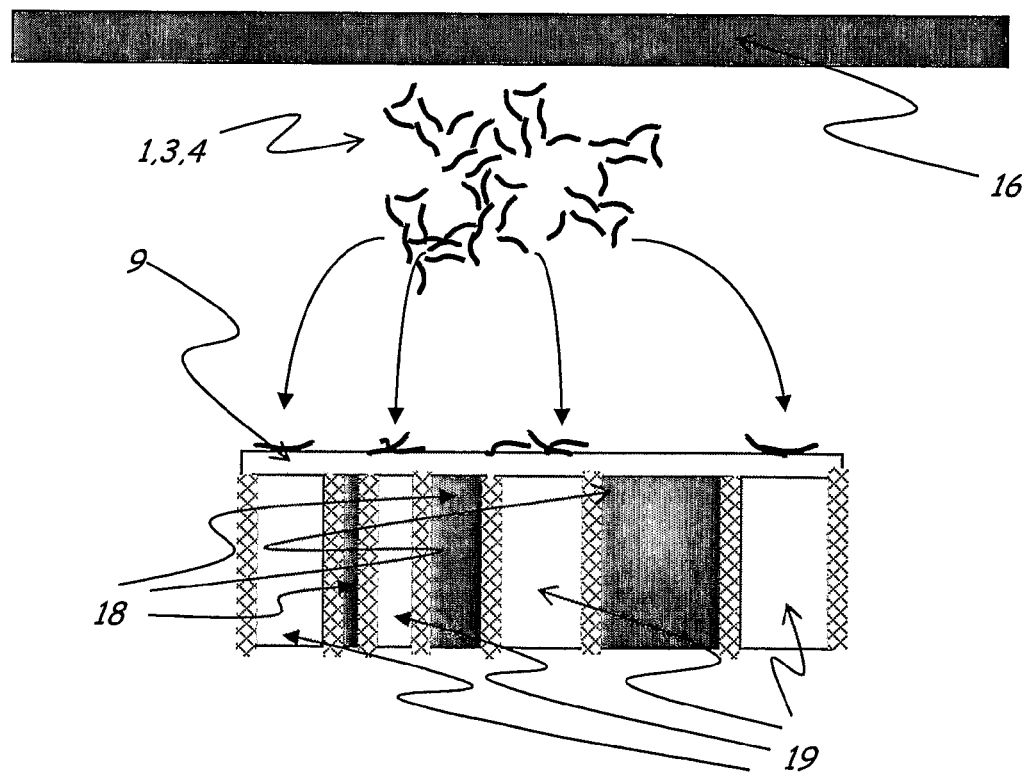
FIGS. 7a and 7b illustrate other embodiments of the present invention for patterned deposition of mixed bundled and individual, only bundled and/or only individual HARM-structures by thermophoresis.
Figure 7B:
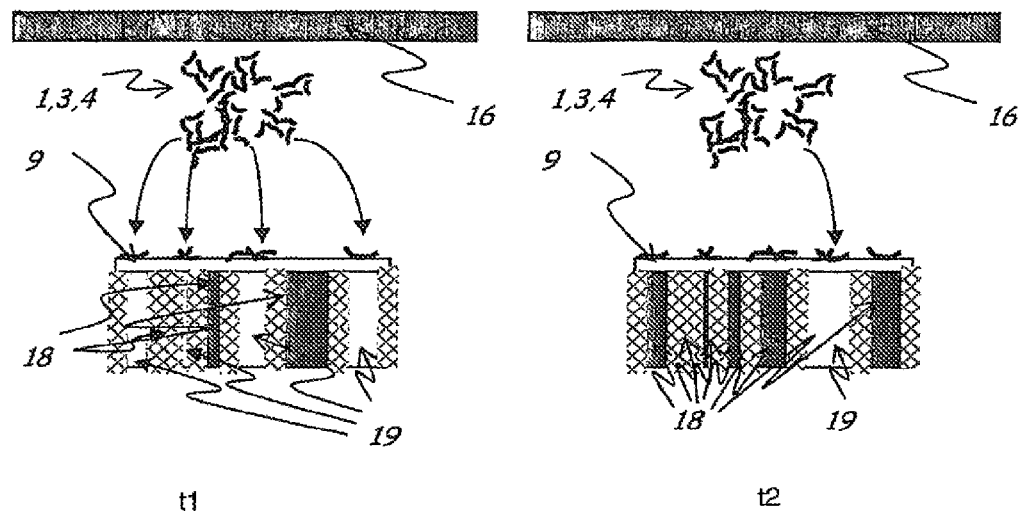

FIG. 7a illustrates a way of depositing HARM-structures, wherein the HARM-structures are deposited in a pattern by patterned heating and cooling of the collection plate. Here a plurality of heating (18) and cooling (19) elements are positioned on one side of the substrate (9) and the aerosol of mixed, bundled and/or individual HARM-structures (1,3,4) are introduced on the other side of the substrate and between a heating plate (16). The HARM-structures are then deposited by the thermophoretic force, i.e. thermophoresis, onto the relatively cooler portions of the substrate. Other means can be used to create the heating and cooling patterns on the substrate. For example, for low heat conducting substrates, radiation (for example laser irradiation) can be used. For example, a pattern of laser beams can be directed toward the cooled substrate to heat particular regions. The method according to the present invention can be used to deposit HARM-structures having different properties to be deposited in different positions as is illustrated in FIG. 7b. Here, at time interval 1 (t1), the heating and cooling of the substrate is in a given pattern whereupon the HARM-structures of type 1 are deposited. Subsequently, the heating and cooling of the substrate is changed and HARM-structures of type 2 are deposited. The process can be repeated to create complex, multi-property deposition patterns.

Figure 8:
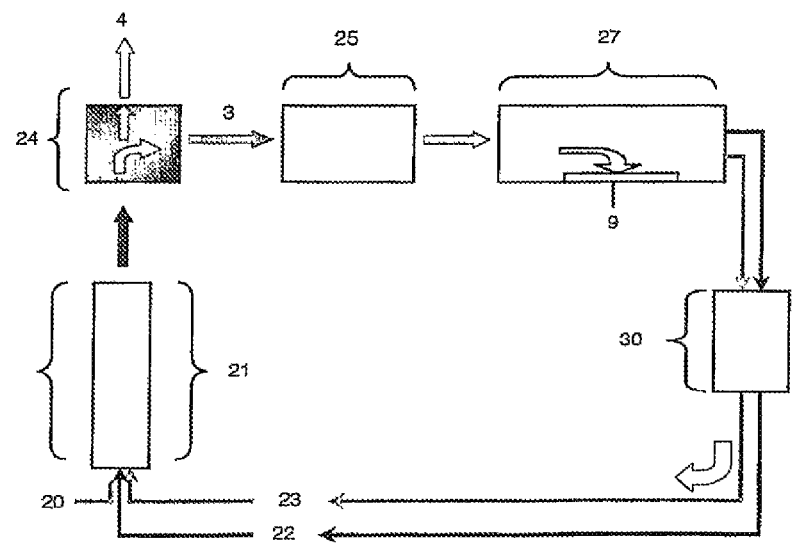
FIG. 8 illustrates a continuous process for the synthesis and further processing of HARM-structures.

FIG. 8 illustrates the incorporation of the method according to the present invention into a HARM-production process. In FIG. 8 the method according to the present invention is incorporated into a floating catalyst HARM production process known in the art. Here, catalyst particles or catalyst particle precursors (20) are introduced into a HARM reactor (21) together with appropriate source(s) (22) and additional reagents (23) as required. An aerosol of HARM-structures exit the reactor and are separated in a separation apparatus (24) which operates according to any of the methods described to separate bundles (4) and individual (3) HARM-structures. Thereafter, the individual HARM-structures can be charged, coated, functionalized or otherwise modified in a conditioning reactor (25) and then deposited on a substrate (9) in a deposition reactor (27) according to any of the methods described to move bundled and/or individual HARM-structures. The deposition layer can be homogeneous layered or patterned according to the methods described in the invention. Furthermore, the deposition layer can be further processed in any suitable way. Further, unused precursors and/or reagents can be recovered in a recovery reactor (30) by means known in the art and fed back into the production cycle. The process can be repeated.

EXAMPLES

In the following examples, bundled and individual HARM-structures, in this example carbon nanotubes (CNT), were moved and thereby separated from each other and separately deposited according to the described invention.

In all examples, the CNTS were continuously synthesized upstream of the separation and deposition steps to produce an aerosol containing a mixture of bundled and individual CNTS. A hot wire generator (HWG) method was used for the synthesis of CNTs as is known in the art. In the method Fe catalyst particles were produced by vaporization from a resistively heated catalyst wire in a $H_2/Ar$ (with a 7/93 mol ratio) flow (400 $cm^3/min$). Particles were formed and grown by vapor nucleation, condensation and particle coagulation processes. Subsequently, the produced particles were introduced into a ceramic tubular reactor at about 400° C., mixed with a carbon monoxide (CO) flow of 400 $cm^3/min$ and heated to induce CNT formation (from 700° C. to 900° C.). A porous tube dilutor (6 l/min) was installed downstream of the reactor to prevent the product deposition on the walls. 12 $cm^3/min$ of $CO_2$ was introduced in the reactor as an etching agent. Unless otherwise stated, all the experiments were carried out using a heating power to the wire of 19 W, a CO concentration of 53% in a $CO/(Ar-H_2)$ (93-7 mol ratio) mixture, and a peak reactor temperature of 700° C. Mobility size distributions of aerosol particles (i.e. catalyst particles, individual CNTs and CNT bundles dispersed in the gas phase) were measured by a differential mobility analyzer system consisting of a classifier, a condensation particle counter, and an optional $^{241}Am$ bipolar charger. Adequate power supplies for applying both positive and negative polarity to the internal electrode were used, while the external electrode was kept grounded. An electrostatic filter (ESF) was located downstream of the reactor and used to filter out the charged aerosol particles (when required). The ESP is comprised of two metallic plates with dimensions of 15 cm, length, and 2 cm, height, separated each other by a distance of 1 cm. This device enabled the filtering out of charged aerosol particles by connecting one of the plates to high voltage (around 4000 V) while the other one was kept grounded. Aerosol particles including catalyst particles and CNT HARM-structures were collected on carbon coated copper grids for their structural characterization by TEM.

Example 1

Figure 9A:
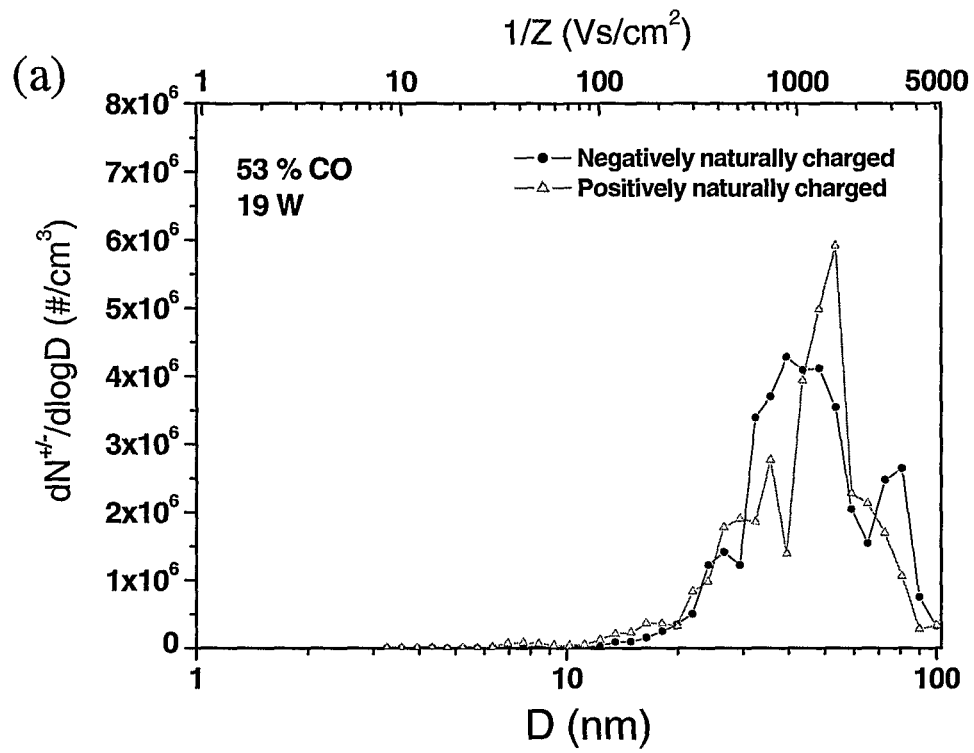
FIG. 9 illustrates (a) mobility size distribution (measured using DMA without $^{241}$Am bipolar charger) of the positively and negatively naturally charged fraction of bundled CNTs in the gas phase; (b) TEM image of the as-grown bundled CNTs.
Figure 9B:
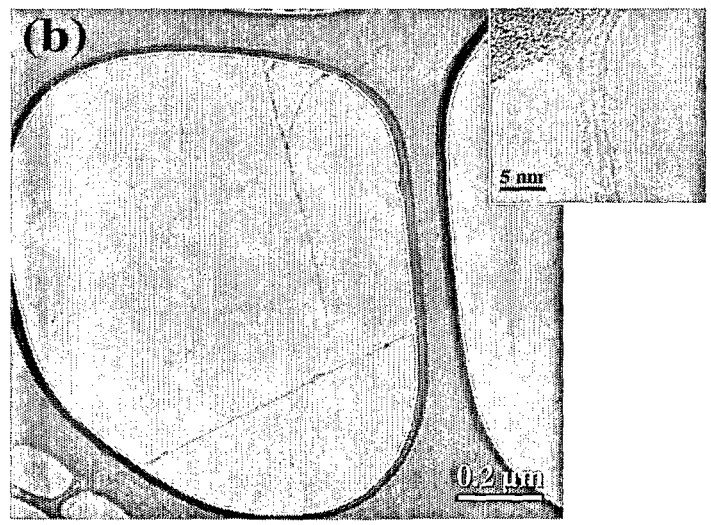

Moving and Separation of Bundled and Individual CNT Harm-Structures by Electrostatic Precipitation by Taking Advantage of the Naturally Charging of Bundled Harm-Structures The mobility size distribution of the naturally charged aerosol particles (i.e. obtained without external bipolar charger prior the DMA) is illustrated in FIG. 9. The figure shows the dependence of the measured frequency on both the equivalent mobility diameter, D, calculated assuming a spherical shape and a single charge, and the inverse electrical mobility, 1/Z. As can be seen, a broad mobility distribution with a mean mobility diameter of around 45 nm was obtained regardless the polarity of the bias and was attributed to the presence of CNTs. TEM observation of the sample produced at 700° C. and directly collected onto the TEM grid from the gas phase showed that the nanotubes were single-walled and clearly aggregated in bundles (FIG. 9b). Since the DMA can classify only charged aerosol particles, these results indicate that the nanotubes coming from the reactor were naturally electrically charged. Furthermore, this phenomenon was observed independently of the polarity applied to the DMA. According to concentration measurements, the CNTs were approximately equally positively and negatively charged with fractions of $N^+=47\%$ and $N^-=53\%$, respectively (table 1).

Previous investigations on metal nanoparticle formation by a HWG indicated that the particles posses electrical charges after their formation. In order to study the possibility that Fe catalyst particles could also become charged in our system, and, consequently be the origin of the charging of the nanotubes, CO was replaced by $N_2$ (thereby preventing the formation of CNTs). Our investigations carried out at temperatures from 25° C. to 900° C. showed that almost all the Fe particles (up to 99%) were electrically neutral (table 2), which suggests that catalyst particles are not directly involved in the observed charging of the nanotubes.

To measure the mobility size distributions of the neutral aerosol particles, the charged aerosol was filtered out by applying a potential difference between electrodes in the ESF. The extracted neutral aerosol particles were artificially charged using the external bipolar charger ($^{241}Am$) prior the mobility distribution measurement by DMA. A peak with a mean equivalent diameter of 5 nm was observed and assigned to Fe catalyst particles that remain inactive for the growth of CNTs. Thus, these results indicate that all the nanotubes were deposited in the ESF and, hence, were electrically charged. Similar results were obtained at 800° C. and 900° C. (table 1).

TABLE 1

Charged fraction ($N^{+/-}$) of CNTs, synthesized using 53% CO and a heating power of 19 W, at different reactor temperatures.

| Temperature (° C.) | $N^{+/-}$ (%) | $N^+$ (%) | $N^-$ (%) |
|---|---|---|---|
| 700 | 99 | 47 | 53 |
| 800 | 99 | 48 | 52 |
| 900 | 97 | 41 | 59 |

($N^+$) and ($N^-$) indicate the polarity distribution of charged CNTs.

TABLE 2

Charged fraction ($N_p^{+/-}$) of Fe catalyst particles produced via HWG method in $N_2$ atmosphere, at different reactor temperatures.

| Temperature (° C.) | $N_p^{+/-}$ (%) | $N_p^+$ (%) | $N_p^-$ (%) |
|---|---|---|---|
| 25 | 1 | 99 | 1 |
| 700 | 1 | 4 | 96 |
| 800 | 4 | 27 | 73 |
| 900 | 2 | 28 | 72 |

($N_p^+$) and ($N_p^-$) indicate the polarity distribution of charged catalyst particles.

Figure 10A:
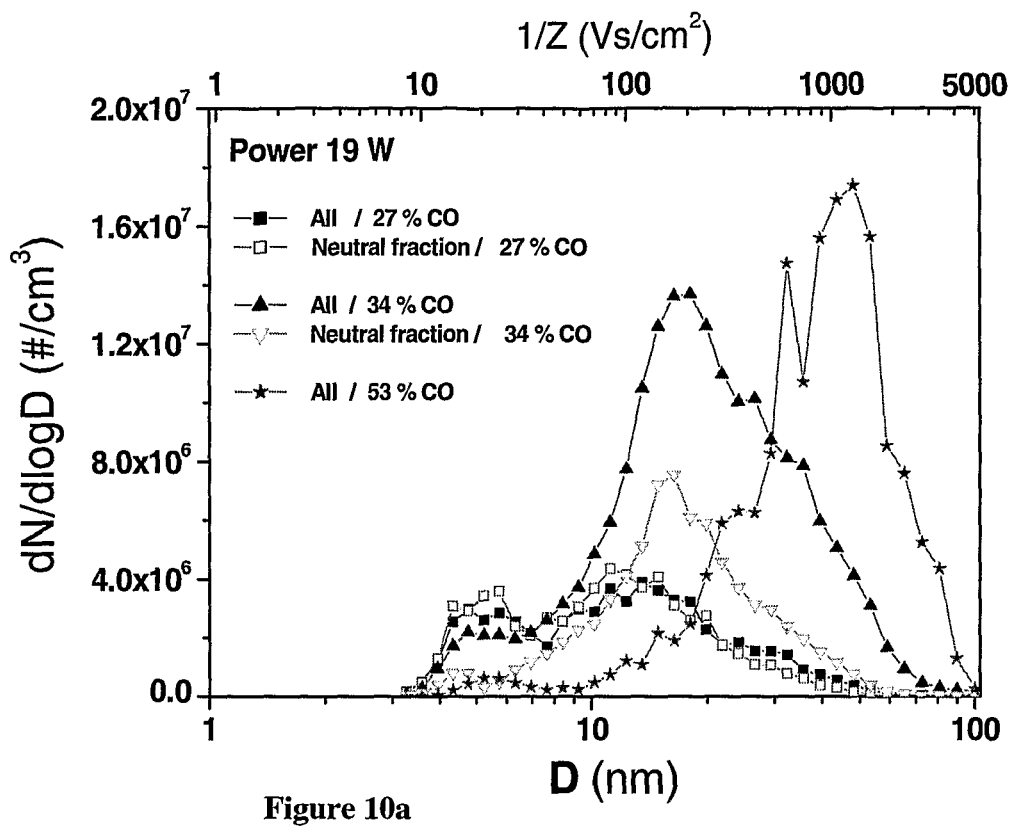
FIG. 10 illustrates a) comparison between the mobility size distributions of all and neutral CNTs and catalyst particles at different CO concentrations and b) charged fraction of particles ($N^{+/-}$) and particle number concentration plotted versus the CO concentration.
Figure 10B:
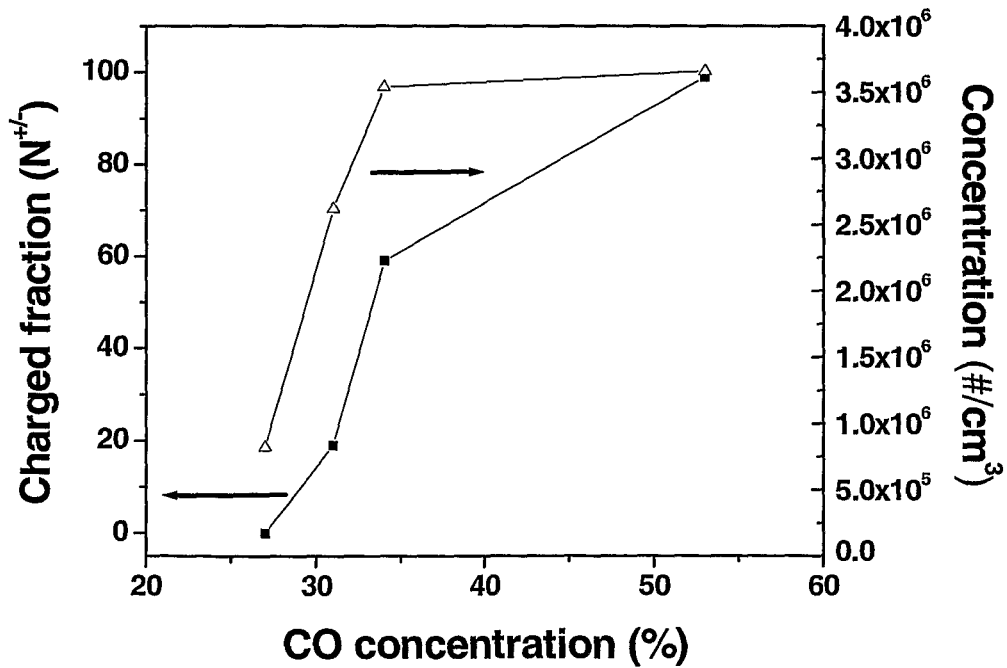

It is known that gas surface reactions may induce electronic excitations at metal surfaces. When highly exothermic reactions take place, these excitations may lead to the ejection of ions and electrons from the surface. As a consequence, it can be speculated that the exothermic CO disproportionation reaction needed for the growth of CNTs might play a role in their electrical charging. In an attempt to study it, experiments were carried out varying the CO concentration. In order to quantitatively estimate the fraction of charged CNTs ($N^{+/-}$), mobility size distributions were measured with the $^{241}$Am bipolar charger prior the classifier. FIG. 10a shows the comparison between the mobility size distributions of all CNTS (ESF off) and the neutral CNTs (ESF on) at CO concentrations of 27%, 34% and 53%. As is expected, the CNT concentration increased with the concentration of carbon source (CO) introduced into the reactor. At the concentration of 27%, the mobility size distribution of all CNTs and the neutral fraction appeared to be identical indicating that almost all CNTs are electrically neutral. However, the fraction of neutral CNTs gradually decreased as the CO concentration was increased. Thus, at 53% of CO, almost all the CNTs were charged. FIG. 10b illustrates concisely the effect of the CO concentration on the total fraction of charged nanotubes ($N^{+/-}$) and the concentration of the product.

Figure 11A:
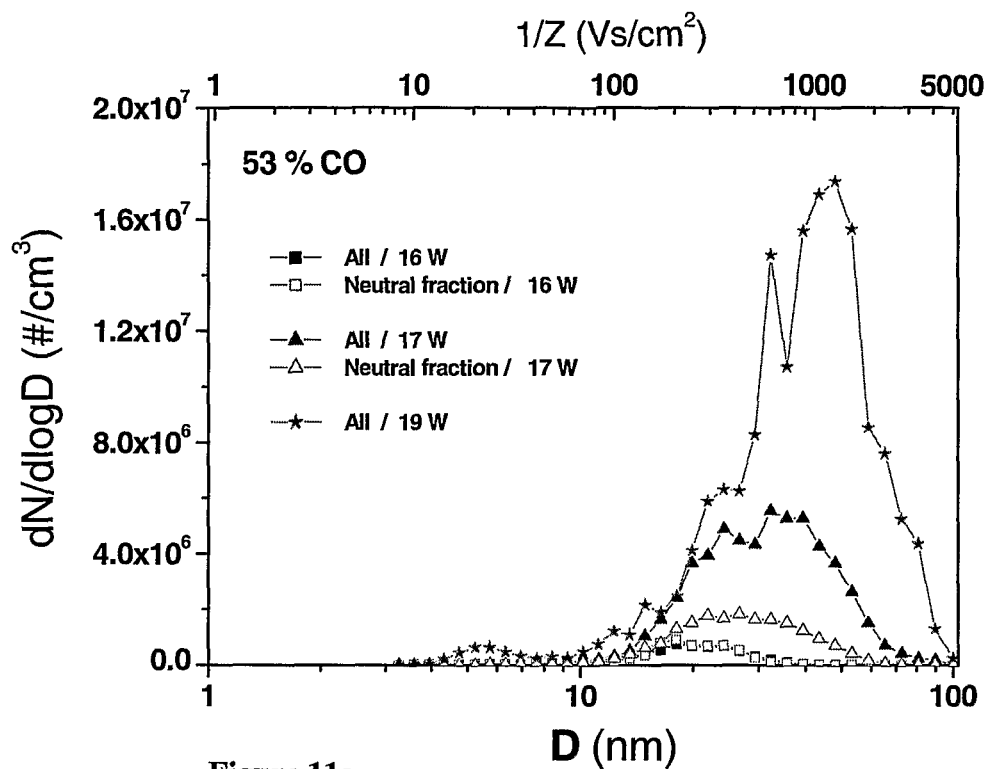
FIG. 11 illustrates a) comparison between the mobility size distributions of all and neutral CNTs and catalyst particles at different hot wire heating powers and b) charged fraction of aerosol particles ($N^{+/-}$) and particle number concentration plotted versus the hot wire heating power.
Figure 11B:
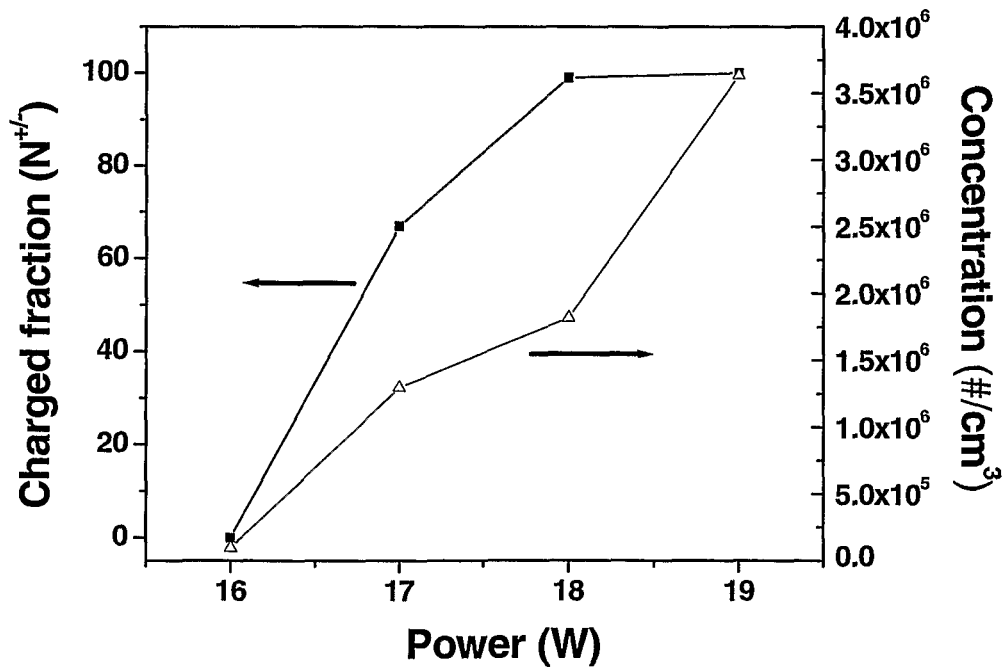

In a similar manner, mobility distributions were also measured varying the heating power applied to the wire from 16 W to 19 W when the CO concentration was kept constant at 53%. Increasing the power increases the concentration of CNTS, due to a higher concentration of Fe catalyst particles produced. Consequently, nanotube bundling increases. As can be seen in FIG. 11, the fraction of the charged CNTs increased with the power applied to the heated wire.

The results show that a higher concentration of CNTs leads to more effective charging. This fact relates to the bundling of the CNTS, since the likelihood for bundling increases with their concentration in the gas phase. Accordingly, the natural charging of the CNTs may happen in the process of formation of bundles. This hypothesis was supported by TEM observation of the sample containing charged CNTS, where only bundled CNTs were found (FIG. 9b).

Figures 12A, 12B:
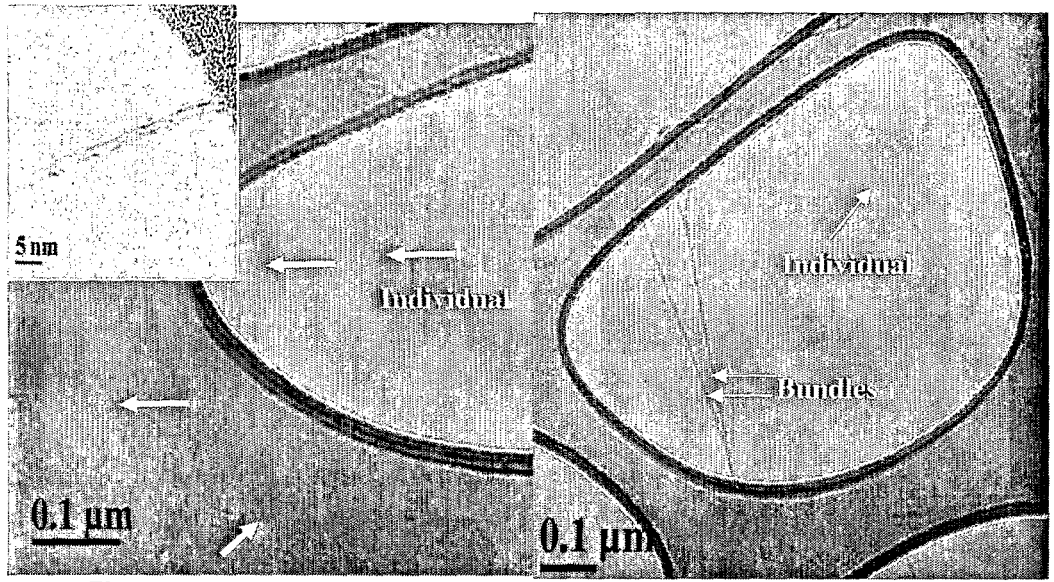
FIG. 12 illustrates TEM images of (a) individual CNTs and (b) both individual and bundles CNTs.

In order to collect the neutral fraction of CNTS, the ESF was used to filter out the charged CNTS. CNTs were synthesized using a heating power of 16.5 W to maintain a low concentration of CNTs and, thereby to minimize their bundling. At these experimental conditions the fraction of charged CNTs was estimated to be around 12%. CNTS were collected directly from gas phase onto a TEM holey carbon film substrate using a point-to-plate electrostatic precipitator. TEM observations of the neutral CNTs revealed the presence of only individual CNTs (FIG. 12a). The collection of the whole product (i.e. without filtering charged CNTs out) revealed the presence of both bundles and individual CNTs (FIG. 12b). This indicates that individual CNTs were neutral whereas bundles were charged.

The charging effect can be explained by the van der Waals energy released during the CNT bundling. In order to minimize the total free energy, CNTs form bundles consisting of individual tubes located parallel to each other. This results in a relatively high energy release: for example, the bundling of two armchair (10,10) CNTs leads to the total energy decrease by as much as 95 eV/100 nm. The bundle may be charged due to the emission of electrons and ions via dissipation of the released van der Waals energy. The high contact area to surface area ratio and high surface area to volume ratio of CNTs likely allows a significant charging that would not be detectable in large and/or low aspect ratio structures.

As the charging process due to bundling is directly related to the high ratio of contact area to volume of these approximately one-dimensional structures, the findings are applicable to any High Aspect Ration Molecular Structures (HARM-structures) as mentioned above.

Example 2

Figures 13A, 13B:
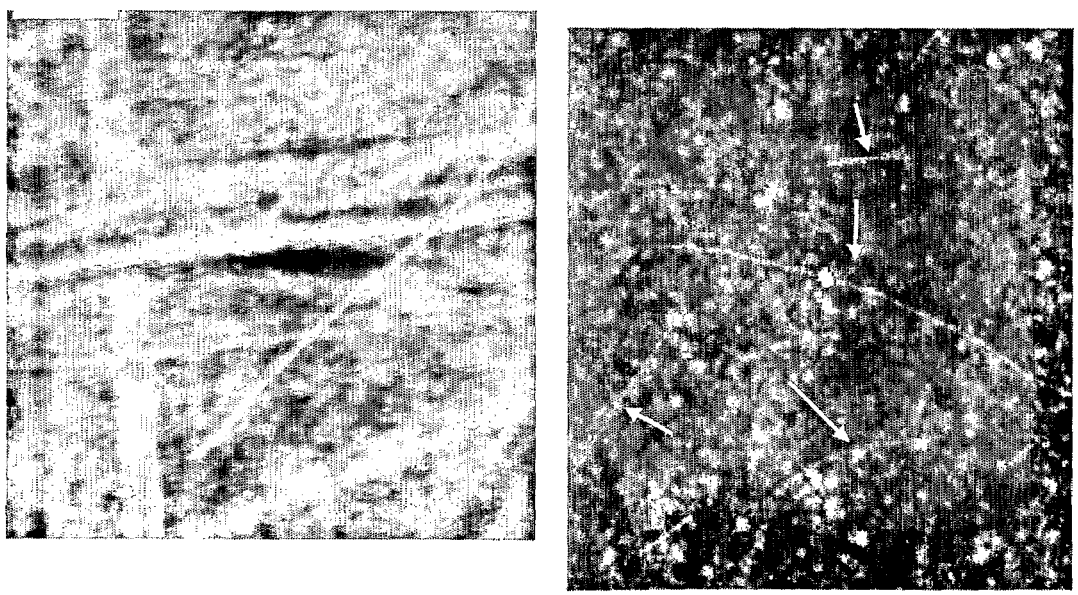
FIG. 13 illustrates AFM images of individual CNTs deposited onto (a) a temperature sensitive polymer-based substrate (SU-8; 10 µm thick layer) and (b) a $Si_3N_4$ substrate (119 µm thick layer).
Figure 14:
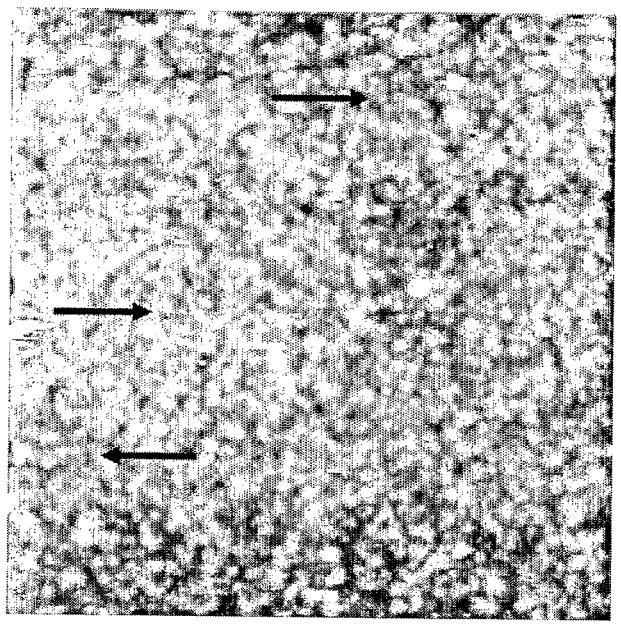
FIG. 14 illustrates AFM image of individual CNTs deposited on a $Si_3N_4$ membrane grid.

Separation of Bundled and Individual CNTs in the Gas Phase and Separate Deposition Via Electrostatic Precipitation on Polymer-Based Substrate and $Si_3N_4$ Substrates Bundled and individual CNTS were moved and thereby separated with the method according to the present invention. The separated CNTs were then separately deposited on a polymer-based substrate (SU-8, 10 μm thick layer), with a degradation temperature of ~300° C., and a $Si_3N_4$ substrate (119 μm thick layer). The deposition was carried out using an electrostatic precipitator (FIG. 4). Atomic force microscopy (AFM) images illustrated in FIG. 13a-b show the presence of individual CNTS, which had been charged before the deposition, with diameters ranging from 0.7 to 1.1 nm determined from the height measurements, which is consistent with what is determined by TEM. In addition, AFM images of individual CNTs collected onto and $Si_3N_4$ substrates (100 nm thick) are shown in FIG. 14.

Example 3

Figure 15:
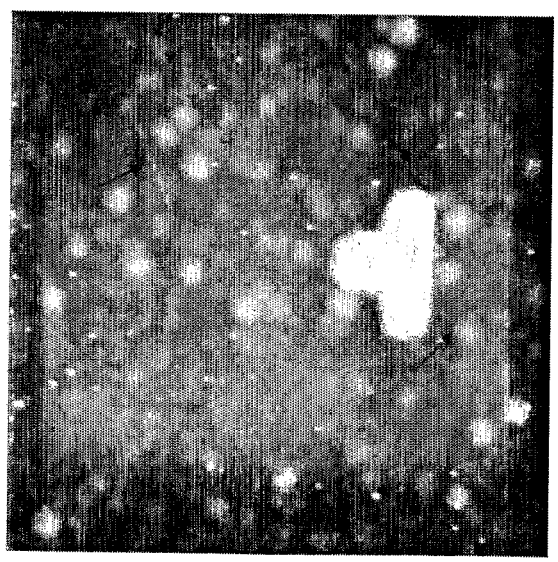
FIG. 15 illustrates AFM image of individual CNTs deposited on a $SiO_2$ substrate.

Separation of Bundled and Individual CNTs in the Gas Phase and Separate Deposition Via Thermophores on a $SiO_2$ Substrate Bundled and individual CNTs were moved and thereby separated with the method according to the present invention. The separated CNTs were then separately deposited on a polymer-based substrate (SU-8, 10 μm thick layer), with a degradation temperature of ~300° C., and a $SiO_2$ substrate. The deposition was carried out using a thermophoretic precipitator (FIG. 6). An atomic force microscopy (AFM) image illustrated in FIG. 15 show the presence of individual CNTS.

The invention is not limited merely to the embodiment examples referred to above, instead many modifications are possible within the scope of the inventive idea defined in the claims.

The invention claimed is:

1. A method for separating bundled high aspect ratio molecular structures (HARMS) from individual high aspect ratio molecular structures (HARMS), comprising:
   providing a gaseous dispersion having the bundled and individual HARMS, which include spontaneously charged bundled HARMS and substantially electrically neutral individual HARMS, applying a DC-generated electric field onto the gaseous dispersion having the bundled and individual HARM-structures, wherein a force generated by the applied electric field is applied on the spontaneously charged bundled HARMS to move the bundled HARM-structures to substantially separate the bundled from the individual HARM-structures.

2. The method according to claim 1, wherein the method further comprises depositing one or more HARM-structures in a gaseous, liquid or solid dispersion and/or matrix and/or on a surface as a layer, pattern and/or structure.

3. The method according to claim 1, wherein the method further comprises depositing the bundled or individual HARM-structure.

4. The method according to claim 1, wherein the method further comprises depositing the bundled and individual HARM-structures.

5. The method according to claim 1, wherein the bundled or individual HARM-structure comprises a nanotube, a carbon nanotube, a fullerene functionalized carbon nanotube, a boron-nitride nanotube, a nanorod including carbon, a phosphorous, boron, nitrogen and/or silicon containing nanorod, a filament or any other tube, rod or ribbon in individual or bundled form.

6. The method according to claim 1, wherein the method further comprises adding one or more reactants, agents, coating materials, functionalizing materials, surfactants and/or dopants to the one or more HARM-structures.

7. The use of a method according to claim 1, in the preparation of a functional material.

8. The use of a method according to claim 1, in the preparation of a thick or thin film, a line, a wire, a pattern, a layered or three dimensional structure.

9. The use of a method according to claim 1, in the preparation of a device.

* * * * *